(No Model.) 2 Sheets—Sheet 1.
H. A. HUGHES.
APPARATUS FOR PREPARING SULPHURETED CREAM OF LIME.
No. 290,642. Patented Dec. 18, 1883.
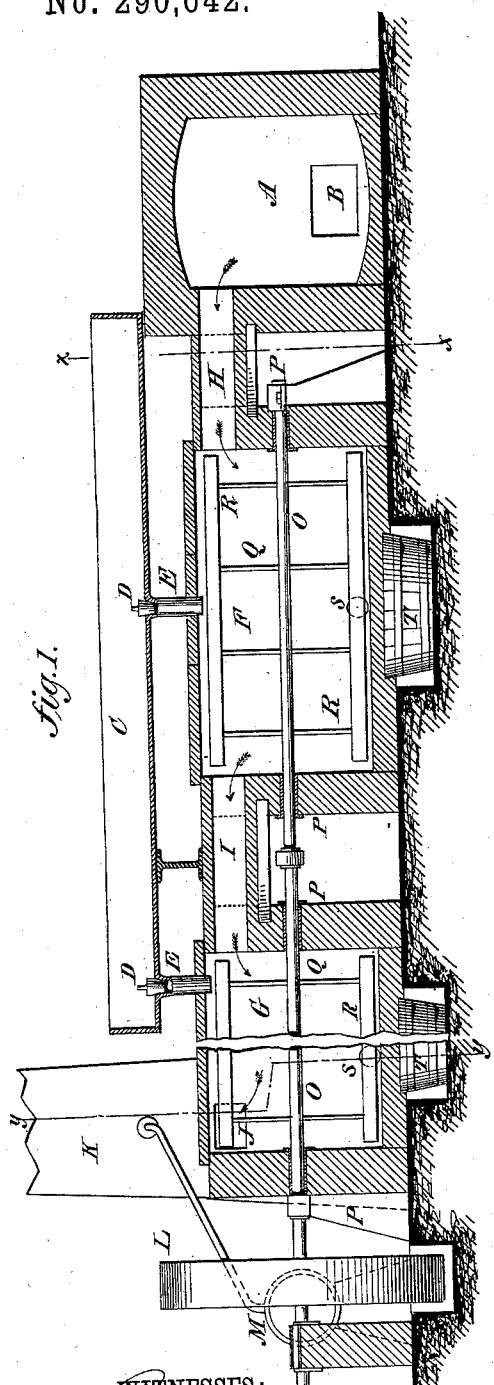
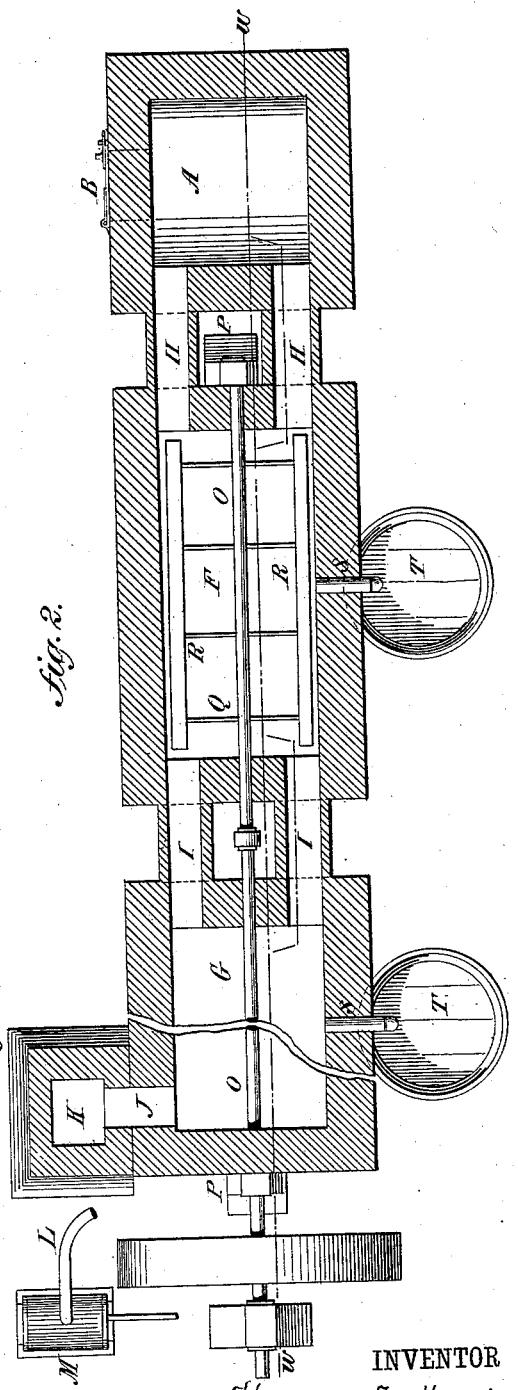
WITNESSES:
Gustave Dieterich
M. F. Burns
INVENTOR
Henry A. Hughes
BY Park Benjamin & Bro
His ATTORNEYS (No Model.) 2 Sheets—Sheet 2.
H. A. HUGHES.
APPARATUS FOR PREPARING SULPHURETED CREAM OF LIME.
No. 290,642. Patented Dec. 18, 1883.
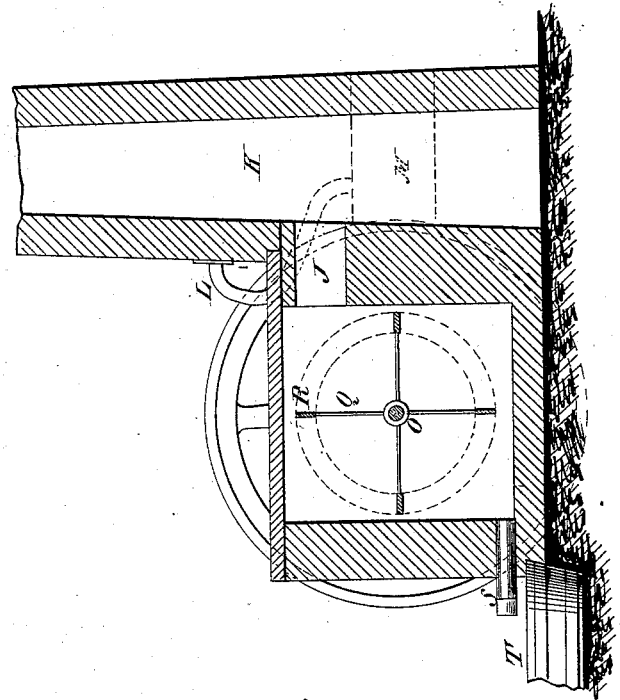
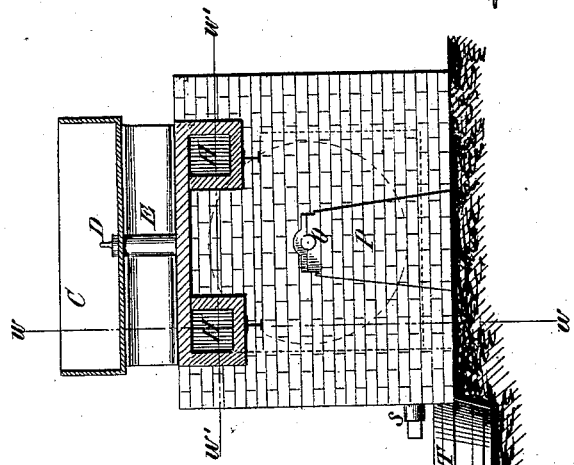

UNITED STATES PATENT OFFICE.

HENRY ALBERT HUGHES, OF CAMDEN, N. J., ASSIGNOR OF TWO-THIRDS TO JAMES P. SCOTT AND GEORGE C. POTTS, BOTH OF PHILADELPHIA, PA.

APPARATUS FOR PREPARING SULPHURETED CREAM OF LIME.

SPECIFICATION forming part of Letters Patent No. 290,642, dated December 18, 1883.

Application filed March 29, 1883. (No model.)

*To all whom it may concern:*

Be it known that I, HENRY A. HUGHES, of Camden, Camden county, New Jersey, have invented a new and useful Improvement in Apparatus for Preparing Sulphureted Cream of Lime for Sugar-Defecation, of which the following is a specification.

The invention relates to an apparatus for mixing together and preparing a sulphureted cream of lime, which I use for defecating saccharine liquors according to processes fully set forth and described in another application for Letters Patent filed simultaneously herewith.

The invention consists in the construction and arrangement of the apparatus, which includes a furnace for generating sulphurous-acid gas by the combustion of sulphur, and mechanism whereby said gas is beaten into the cream of lime in suitable vats in order to produce the desired defecating substance.

In the accompanying drawings, Figure 1 is a longitudinal vertical section on the line W W of Fig. 2. Fig. 2 is a horizontal section. Fig. 3 is a transverse section on the line Y Y of Fig. 1. Fig. 4 is a transverse section on the line X X of Fig. 1.

Similar letters of reference indicate like parts.

A is the sulphur-furnace, having a charging-door, B, in which furnace I place sulphur and burn the same, so as to produce sulphurous-acid gas.

C is a shallow tank, of iron or other suitable material, in which I place freshly-slaked lime and water, the two ingredients being mingled to make a thick cream. In the bottom of the tank C, I provide openings closed by plugs D, from which openings tubes E lead downward into the mixing-vats F and G. After the cream of lime is mixed in the tank C to the proper consistence, the plugs D are raised, and a suitable quantity of the cream of lime is allowed to flow into the vats F and G through the tubes E. The sulphurous-acid gas from the furnace A proceeds in the direction of the arrows, Fig. 1, through the flues H to the vat F, where it meets the cream of lime which has been placed in that vat. Such of the gas as is not taken up by the cream of lime in the vat F passes through the flues I into the vat G, where it meets the cream of lime in that vat, and such excess of gas as is not then taken up by the cream of lime escapes by the flue J into the chimney K. An artificial draft is produced in this chimney through the exhaust-steam of the steam-engine M, being led into said chimney by means of the pipe L, as shown in Fig. 3. This artificial draft draws the heavy sulphurous-acid gas out of the furnace into and through the vats. The steam-engine M rotates the shaft O, which shaft extends through the vats F and G, and has its bearings in the ends of said vats, as shown at P. Attached to said shaft, and within the vats F and G, are radial arms Q, which carry beaters or paddles R. The rotation of this shaft O causes, by means of the beaters R, the violent agitation of the cream of lime in the vats F and G, so that the same may be more fully exposed to the action of the sulphurous-acid gas, or, rather, so that the said gas may be more effectually beaten into and combined with the cream of lime.

It is not essentially necessary to have two vats, F and G, inasmuch as one may serve all practical purposes; but where large quantities of the mixture are to be prepared it is more economical to have the second vat, G, or even a third vat, so as to utilize as much as possible of the sulphurous-acid gas which may escape from the first vat.

Near the bottom of each vat I provide an escape-orifice, S, which may be provided with a tube and a plug, and through which the contents of the vats are drawn off into the tubs or other receptacles T.

I am aware that a machine for combining sulphurous-acid gas with lime and water, consisting in a series of connected vessels, through which the liquid passes in one direction and the gas in the other, and containing rotary beaters, is not new, and that, broadly, there is no novelty in beating sulphurous-acid gas into so-called "milk of lime."

I claim as my invention—

1. The combination of the furnace A, the vats G and F, and the tank C, having independent tubes E communicating with each of said vats, and the said vats having separate escape-orifices S S and connecting-flues H I J, substantially as described.

2. The combination of the furnace A, flues H, located near the top, vat F, containing a shaft, O, provided with arms or beaters Q R, tank C, and connecting-pipe E, substantially as described.

3. The combination of the furnace A, flues H, vat F, flues I, located near the top of the vats, vat G, flue J, steam-engine exhaust-pipe L, and chimney K, substantially as described.

4. The combination of the furnace A, flues H and I, vats F and G, arranged on substantially the same level, and containing the shaft O, provided with beaters Q R, the tank C, and connecting-pipes E, substantially as described.

HENRY ALBERT HUGHES.

Witnesses:
GEORGE BIDDLE,
J. RODMAN PAUL.